United States Patent
Cho et al.

(10) Patent No.: US 9,851,743 B2
(45) Date of Patent: *Dec. 26, 2017

(54) LOOKUP TABLE SHARING FOR MEMORY-BASED COMPUTING

(71) Applicant: INTERNATIONAL BUSINESS MACHINES CORPORATION, Armonk, NY (US)

(72) Inventors: Minsik Cho, Austin, TX (US); Ruchir Puri, Baldwin Place, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/014,729

(22) Filed: Feb. 3, 2016

(65) Prior Publication Data

US 2016/0154767 A1 Jun. 2, 2016

Related U.S. Application Data

(63) Continuation of application No. 13/968,900, filed on Aug. 16, 2013, now Pat. No. 9,304,972, which is a
(Continued)

(51) Int. Cl.
G06F 1/03 (2006.01)
G06F 17/10 (2006.01)
(Continued)

(52) U.S. Cl.
CPC ............... *G06F 1/03* (2013.01); *G06F 7/507* (2013.01); *G06F 7/5057* (2013.01); *G06F 7/53* (2013.01); *G06F 17/10* (2013.01)

(58) Field of Classification Search
None
See application file for complete search history.

(56) References Cited

U.S. PATENT DOCUMENTS 7,362,355 B1 4/2008 Yang et al.
8,782,115 B1 * 7/2014 Dhanoa .................. G06F 17/16
375/260
(Continued)

FOREIGN PATENT DOCUMENTS

EP 0447244 A2 3/1991

OTHER PUBLICATIONS

Anonymous. "Method of Building a Common Look-Up Table for Facilities Used in the Functional Golden Environment to Run the Golden Tests, and Verify the Functional Equivalence of Two Designs" The IP.com Prior Art Database. Nov. 2011. pp. 1-3. Available at http://priorartdatabase.com/IPCOM/000212677.
(Continued)

*Primary Examiner* — Michael D Yaary
(74) *Attorney, Agent, or Firm* — Tutunjian & Bitetto, P.C.; Rabin Bhattacharya

(57) ABSTRACT

Methods and systems for memory-based computing include combining multiple operations into a single lookup table and combining multiple memory-based operation requests into a single read request. Operation result values are read from a multi-operation lookup table that includes result values for a first operation above a diagonal of the lookup table and includes result values for a second operation below the diagonal. Numerical inputs are used as column and row addresses in the lookup table and the requested operation determines which input corresponds to the column address and which input corresponds to the row address. Multiple operations are combined into a single request by combining respective members from each operation into respective inputs an reading an operation result value from a lookup table to produce a combined result output. The combined result output is separated into a plurality of individual result outputs corresponding to the plurality of requests.

10 Claims, 3 Drawing Sheets

Related U.S. Application Data continuation of application No. 13/929,084, filed on Jun. 27, 2013, now Pat. No. 9,304,971.

(51) Int. Cl.
  *G06F 7/505* (2006.01)
  *G06F 7/53* (2006.01)
  *G06F 7/507* (2006.01)

(56) References Cited

U.S. PATENT DOCUMENTS

| | | |
|---|---|---|
| 2004/0220990 A1 | 11/2004 | Fukuda |
| 2005/0231234 A1 | 10/2005 | Gude |
| 2009/0172053 A1 | 7/2009 | Nam et al. |

OTHER PUBLICATIONS

Harr, J. "Digital Filter With Dual-Table Look-Up Multiply" IBM Technical Disclosure Bulletin, vol. 36, No. 11. Nov. 1993. pp. 301-304.

Office Action for U.S. Appl. No. 15/015,803 dated Nov. 1, 2016 (12 pages).

* cited by examiner

… … … … … …

LOOKUP TABLE SHARING FOR MEMORY-BASED COMPUTING

BACKGROUND

1. Technical Field

The present invention relates to memory-based computing and, more particularly, to multifunction lookup table sharing in memory-based computing platforms.

2. Description of the Related Art

Memory-based computing is fast becoming a viable technology. With new memory technologies on the horizon, memory is becoming available that provides high densities at a very low cost, high reliability, low power consumption, and high manufacturing yields. In other words, memory technologies are advancing more quickly than corresponding logic technologies, such that it will become advantageous in many cases to simply store and look up the results of certain logic operations rather than to perform those operations each time they are needed.

However, in conventional memory-based computing, performing such operations in parallel needs multiple lookup tables, and each operation type needs a separate lookup table. For example, a conventional addition lookup table can be used only for the purpose of addition, because each value in the lookup table corresponds to a specific sum. This leads to inefficiencies, as many lookup tables are provided to meet peak capacity and may go unused in most use cases.

SUMMARY

A method for memory-based computation includes receiving a request having two numerical inputs and a requested operation and reading an operation result value from a multi-operation lookup table using a processor, wherein the multi-operation lookup table includes result values for a first operation above a diagonal of the lookup table and includes result values for a second operation below the diagonal, wherein the numerical inputs are used as column and row addresses in the lookup table, and wherein the requested operation determines which input corresponds to the column address and which input corresponds to the row address.

A system for memory-based computation includes a multi-operation lookup table comprising result values for a first operation above a diagonal of the lookup table and result values for a second operation below the diagonal; and a processor configured to receive a request having two numerical inputs and a requested operation and to read an operation result value from the lookup table, wherein the processor is configured to use the inputs as column and row addresses in the lookup table and wherein the requested operation determines which input corresponds to the column address and which input corresponds to the row address.

A method for memory-based computation includes receiving a plurality of requests, each having two numerical inputs and a requested operation; combining a first input from each of the plurality of requests into a first combined input; combining a second input from each of the plurality requests into a second combined input; reading an operation result value from a lookup table to produce a combined result output using a processor; and separating the combined result output into a plurality of individual result outputs corresponding to the plurality of requests.

A system for memory-based computation includes a lookup table comprising result values for an operation; and a processor configured to receive a plurality of requests, each having two numerical inputs and a requested operation, to combine a first input from each of the plurality of requests into a first combined input, to combine a second input from each of the plurality requests into a second combined input, to read an operation result value from a lookup table to produce a combined result output, and to separate the combined result output into a plurality of individual result outputs corresponding to the plurality of requests.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide memory management that increases the efficiency of lookup table use and storage. In particular, the present principles accomplish this by providing lookup table addressing and storage that allow for multi-function use, thereby allowing more operations to be performed by a smaller number of actual lookup tables. This results in increased speed and decreased storage needs.

Table 1 below shows a standard "addition" lookup table that stores all of the possible results for the addition of two numbers having, e.g., 16 bits. The top row shows one summand, while the leftmost column shows the second summand. Similarly, table 2 below shows a standard "multiplication" lookup table that stores all of the possible results for the multiplication of two numbers having, e.g., 16 bits. The top row shows one factor, while the leftmost column shows the second factor.

TABLE 1

| Addition | 1 | 2 | 3 | 4 | ... |
|---|---|---|---|---|---|
| 1 | 2 | 3 | 4 | 5 | ... |
| 2 | 3 | 4 | 5 | 6 | ... |
| 3 | 4 | 5 | 6 | 7 | ... |
| 4 | 5 | 6 | 7 | 8 | ... |
| ... | ... | ... | ... | ... | ... |

TABLE 2

| Multiplication | 1 | 2 | 3 | 4 | ... |
|---|---|---|---|---|---|
| 1 | 1 | 2 | 3 | 4 | ... |
| 2 | 2 | 4 | 6 | 8 | ... |
| 3 | 3 | 6 | 9 | 12 | ... |
| 4 | 4 | 8 | 12 | 16 | ... |
| ... | ... | ... | ... | ... | ... |

As can be readily seen from these examples, half of the space in each lookup table is wasted—the numbers below the diagonal are exactly the same as the numbers above the diagonal. This is because addition and multiplication are commutative operations, where the order of the operands does not affect the outcome—2+3=3+2=5. It is worth noting that this is not true for all types of operation. For example, division does not commute, and the quotient of two numbers may change depending on the order of those numbers.

According to the present principles, the lookup tables of commuting operations may be combined to save space. In other words, a single table may be used to accommodate both addition and multiplication, or any other combination of suitable commuting operations. Table 3 below shows such a combined lookup table, where multiplication operations are stored along and above the diagonal, while addition operations are stored below the diagonal. It should be noted that the table may be presented equivalently as having addition entries above the diagonal and multiplication alone and below the diagonal.

TABLE 3

| Addition/Multiplication | 1 | 2 | 3 | 4 | ... |
|---|---|---|---|---|---|
| 1 | 1 | 2 | 3 | 4 | ... |
| 2 | 3 | 4 | 6 | 8 | ... |
| 3 | 4 | 5 | 9 | 12 | ... |
| 4 | 5 | 6 | 7 | 16 | ... |
| ... | ... | ... | ... | ... | ... |

Figure 1:
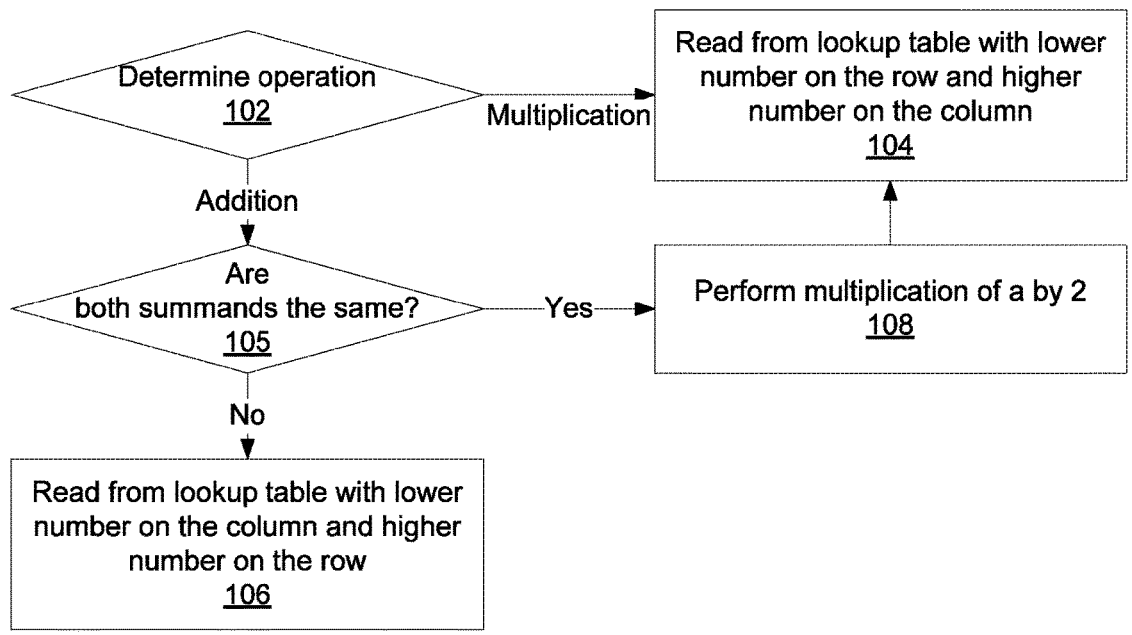
FIG. 1 is a block/flow diagram of a method for combining multiple memory-based operations into a single table in accordance with the present principles.

Referring now to FIG. 1, a method for performing memory-based operations using a combined-operation lookup table is shown. Whereas conventional lookup table operations are a simple read from the table, some logic is needed to navigate the combined lookup table shown in Table 3. Block 102 determines which operation to use. Although the present embodiments are illustratively described with respect to addition and multiplication, it should be understood that other commutative operations may be used instead.

If multiplication is called for, block 104 reads from the lookup table with a lower number as the row entry and the higher number as the column entry. This puts the read operation into the upper-right half of the table and ensures that a multiplication result will be read out. If addition is called for, block 105 determines whether the summands are the same. If not, block 106 reads from the lower-left half of the table by applying the lower number to the column and the higher number to the row, ensuring that an addition result will be read out. It should be understood that, if the positions of the addition and multiplication values are swapped in the table, blocks 104 and 106 will reverse the order of the operands accordingly.

If both summands are the same, an additional step 108 is taken to convert the operation to a multiplication. Because the diagonal is occupied by multiplication values, the addition of two like summands is not actually present in the table. Instead, block 108 changes the operation to a multiplication by two. So, for example, if the original operation is N+N, then block 108 converts the operation to 2*N. Processing then proceeds to block 104 to read out the multiplication value from the table. It should be understood that alternative combinations, other than addition and multiplication, will need to address the issue of overlapping diagonals in their own way.

It will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

In addition to creating multifunction tables that store the results of multiple different operations, the present principles provide addressing that can perform multiple such operations in a single read from the lookup table.

Figure 2:
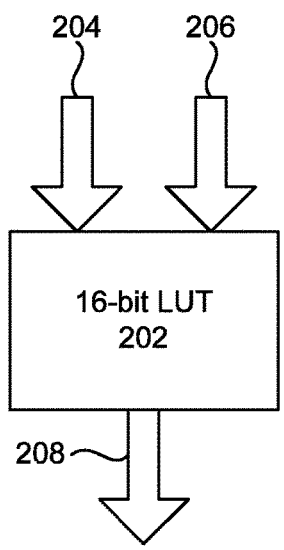
FIG. 2 is a diagram of performing a memory-based operation in accordance with the present principles.

Referring now to FIG. 2, an illustration of a multi-operation read from a lookup table is shown. As noted above, the lookup table 202 receives two inputs 204 and 206, corresponding to the two operands. In the present case, the lookup table 202 receives two 16-bit inputs and produces a 17-bit result 208, where the additional bit represents a "carry" bit, in case the sum exceeds the size of the input. The two inputs 204 and 206 therefore represent an address within the LUT 202.

In many cases, however, operations are performed on numbers that will take less than the full 16 bits. For example, consider two addition operations, the first of which adds two 6-bit numbers and the second of which adds two 9-bit numbers. The present embodiments allow the two operations to be performed by a single read from the lookup table 202. This may be accomplished by concatenating the 6-bit and the 9-bit number, leaving a bit in-between for an additional carry bit.

Figure 3:
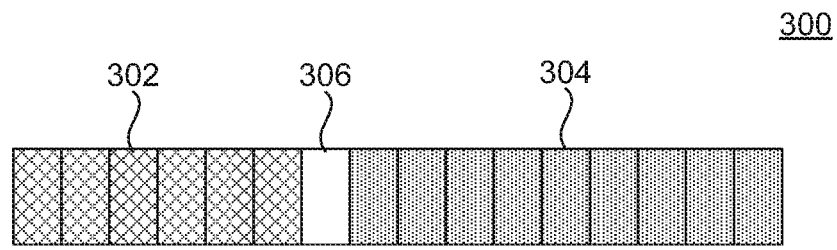
FIG. 3 is a diagram of a single read request that includes multiple memory-based operations in accordance with the present principles.

Referring now to FIG. 3, a combined operation value 300 is shown. This 16-bit value forms one of the two inputs 204 or 206 to the lookup table 202. A first section 302 of the value 300 represents a 6-bit summand, while a second section 304 of the value 300 represents a 9-bit summand. A single carry bit 306 separates the two sections and is associated with the latter section 304. The carry bit 306 should be set to "zero," as setting it as a "one" would cause a conflict with the addition for the first section 302.

Two such values 300 are used as inputs 204 and 206 and are used to read out a value 300 plus a carry bit from the lookup table 202. As noted above, the +1 bit represents a carry bit and in this context represents the carry bit for the first section 302 of the output. In an addition operator table, the output 208 will therefore include a 6-bit sum in the first section 302 and a 9-bit sum in the second section 304, with the first section's carry bit being handled by conventional means and the second section's carry bit being stored in bit 306.

This multi-operation input may be used with lookup tables of any size and may be arbitrary subdivided into any number of separate operations, as long as one bit is preserved for each additional operation. So, in the above example of a 16-bit lookup table 202, the inputs 204 and 206 may comprise a single 16-bit value, a 6-bit and a 9-bit value as described above in FIG. 3, a 6-bit and two 4-bit values, or any other suitable combination.

Figure 4:
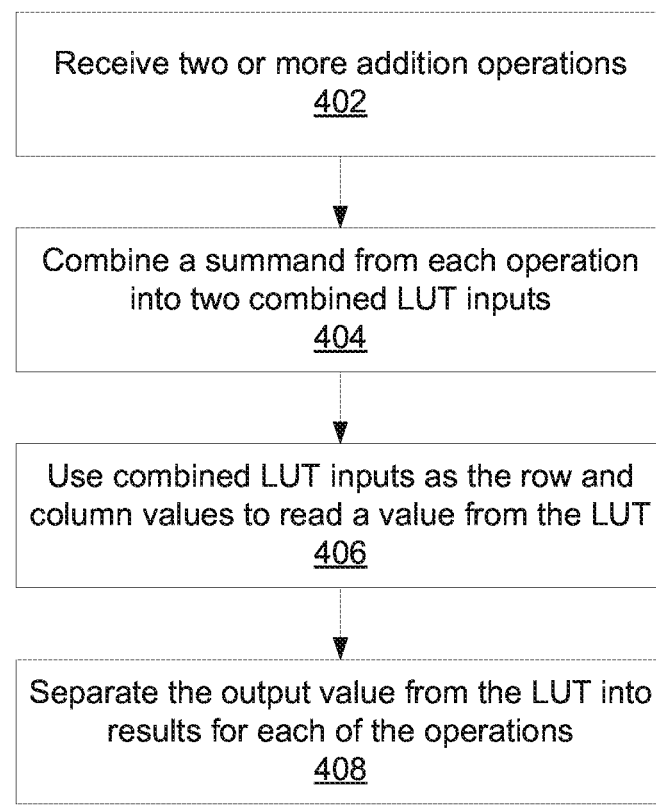
FIG. 4 is a block/flow diagram of a method for combining multiple memory-based operations in a single read request in accordance with the present principles.

Referring now to FIG. 4, a method for performing combined addition operations is shown. It should be understood that, although integer addition is specifically described herein, the present principles may be applied to other kinds of operation as well. Block 402 receives two or more addition operations, each operation having two associated inputs. Block 404 combines the operations into combined lookup table inputs by taking a summand from each input operation and concatenating these summands into a single value 300, as described above, leaving one bit in between each summand as a carry bit. This produces two input values 204 and 206 for the lookup table 202.

Block 406 uses the combined input values 204 and 206 as row and column values to read out a sum from the lookup table 202, producing an output 208. Block 408 separates the output 208 into sums for each of the operations, with each operation having an output that is one bit longer than its inputs to account for the carry bit.

It should be understood that the combination of addition operations may be extended to include subtraction operations as well. A subtraction of a first number from a second number may be performed by finding the complement of the first number and adding that complement to the first. One may find the complement by inverting the bits (e.g., 0011 becomes 1100) and adding one (1101). So, for example, performing 5–3 results in 0101 minus 0011, which becomes 0101 plus 1101. This sum is 10010. Throwing away the carry bit results in 0010, or the number 2. By re-characterizing subtraction as an addition, multiple kinds of operation can be combined into a single read operation.

Figure 5:
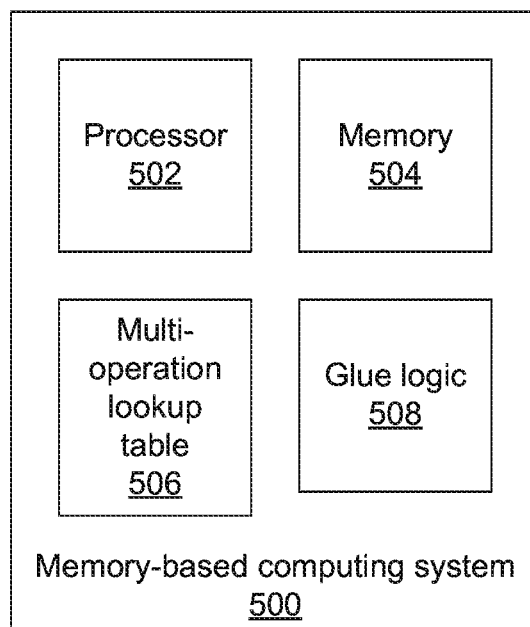
FIG. 5 is a block diagram of a memory-based computing system in accordance with the present principles.

Referring now to FIG. 5, a memory-based computing system 500 is shown. The system 500 includes a processor 502 and memory 504. The memory 504 stores at least one multi-operation lookup table 506 as described above. Upon receipt of an operation request, processor 502 employs glue logic 508 as described above to determine how to apply the request to the lookup table 506 to produce an output value. Glue logic 508 may further be employed to combine multiple operation requests into a single request for the multi-operation lookup table 506.

Having described preferred embodiments of a system and method for lookup table sharing for memory-based computing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for memory-based computation, comprising:
a multi-operation lookup table comprising result values for a first operation above a diagonal of the lookup table and result values for a second operation below the diagonal; and
a processor configured to receive a request having two numerical inputs and a requested operation and to read an operation result value from the lookup table, wherein the processor is configured to use the inputs as column and row addresses in the lookup table and wherein the requested operation determines which input corresponds to the column address and which input corresponds to the row address.

2. The system of claim 1, wherein the multi-operation lookup table comprises values for addition and multiplication operations.

3. The system of claim 2, wherein values on the diagonal of the multi-operation lookup table represent values for the multiplication operation.

4. The system of claim 3, wherein the processor is further configured to convert a request for addition of two like inputs to a multiplication of one of the inputs by two.

5. A computer readable storage medium comprising a computer readable program for memory-based computing, wherein the computer readable program when executed on a computer causes the computer to perform the steps of:
receiving a request having two numerical inputs and a requested operation; and
reading an operation result value from a multi-operation lookup table using a processor, wherein the multi-operation lookup table includes result values for a first operation above a diagonal of the lookup table and includes result values for a second operation below the diagonal, wherein the numerical inputs are used as column and row addresses in the lookup table, and wherein the requested operation determines which input corresponds to the column address and which input corresponds to the row address.

6. A system for memory-based computation, comprising:
a lookup table comprising result values for an operation; and
a processor configured to receive a plurality of requests, each having two numerical inputs and a requested operation, to combine a first input from each of the plurality of requests into a first combined input, to combine a second input from each of the plurality requests into a second combined input, to read an operation result value from a lookup table to produce a combined result output, and to separate the combined result output into a plurality of individual result outputs corresponding to the plurality of requests.

7. The system of claim 6, wherein the processor is further configured to concatenate the respective inputs with one bit in between each input.

8. The system of claim 7, wherein the processor is further configured to extract a plurality of numerical values from the combined result output, each of said numerical values having a length equal to a length of a corresponding input value plus one bit.

9. The system of claim 7, wherein the plurality of requests include at least one addition operation and at least one subtraction operation.

10. A computer readable storage medium comprising a computer readable program for memory-based computing, wherein the computer readable program when executed on a computer causes the computer to perform the steps of:
receiving a plurality of requests, each having two numerical inputs and a requested operation;
combining a first input from each of the plurality of requests into a first combined input;
combining a second input from each of the plurality requests into a second combined input;
reading an operation result value from a lookup table to produce a combined result output using a processor; and
separating the combined result output into a plurality of individual result outputs corresponding to the plurality of requests.

* * * * *